United States Patent
Jameson

(10) Patent No.: US 11,606,950 B2
(45) Date of Patent: Mar. 21, 2023

(54) GAME BAIT DECOY

(71) Applicant: William Fredrick Jameson, Alpharetta, GA (US)

(72) Inventor: William Fredrick Jameson, Alpharetta, GA (US)

(*) Notice: Subject to any disclaimer, the term of this patent is extended or adjusted under 35 U.S.C. 154(b) by 319 days.

(21) Appl. No.: 16/832,930

(22) Filed: Mar. 27, 2020

(65) Prior Publication Data

US 2021/0298289 A1 Sep. 30, 2021

(51) Int. Cl.
*A01M 31/06* (2006.01)

(52) U.S. Cl.
CPC .................... *A01M 31/06* (2013.01)

(58) Field of Classification Search
CPC .... A01M 31/06; A01M 31/00; A01M 31/008; A01M 31/02; A01M 31/025
USPC .................. 43/2, 3; 428/66.5, 66.6
See application file for complete search history.

(56) References Cited

U.S. PATENT DOCUMENTS

| | | | | |
|---|---|---|---|---|
| 2,730,828 A * | 1/1956 | Caretti | ............... | A01K 39/0106 43/2 |
| 4,186,507 A * | 2/1980 | Stinnett | ............... | A01M 31/00 43/1 |
| 4,607,447 A * | 8/1986 | Wright | ............... | A01M 31/06 43/2 |
| 4,777,755 A * | 10/1988 | Colburn | ............... | E04H 15/001 D25/16 |
| 5,813,160 A * | 9/1998 | Thoelke | ............... | E04H 15/001 135/901 |
| 10,612,265 B1 * | 4/2020 | Walter | ............... | E04H 15/001 |
| 11,044,903 B1 * | 6/2021 | Foate | ............... | A01M 31/06 |
| 2004/0060223 A1 * | 4/2004 | Mercier | ............... | A01M 31/06 43/2 |
| 2005/0000143 A1 * | 1/2005 | Smith | ............... | A01M 31/008 43/2 |
| 2007/0051029 A1 * | 3/2007 | Ring | ............... | A01M 31/06 43/2 |
| 2009/0107025 A1 * | 4/2009 | Bolton | ............... | A61G 7/05776 43/2 |
| 2013/0152448 A1 * | 6/2013 | Ewert | ............... | A01M 31/008 43/2 |
| 2018/0064096 A1 * | 3/2018 | Kruska | ............... | F16M 11/242 |
| 2018/0070580 A1 * | 3/2018 | Laniewicz | ............ | A01M 31/06 |
| 2019/0335743 A1 * | 11/2019 | Payne | ............... | A01M 31/06 |

(Continued)

OTHER PUBLICATIONS

Modern Pest Services, What Pests Are Lurking in the Bottom of Your Leaf Pile?, https://www.modernpest.com/blog/pests-lurking-bottom-leaf-pile/, published Sep. 27, 2017.*

(Continued)

*Primary Examiner* — Kathleen I Alker

(57) ABSTRACT

A non-edible game attractant that visually attracts game in the form of a game bait decoy is provided. The game bait decoy may provide a decoy sheet having outward-facing attractant simulating indicia. The decoy sheet may be anchored to the ground over a pile structure to mimic the shape of a bait pile. The decoy sheet may provide flaps defined by slots for enabling animal access to the pile structure and allowing sufficient air flow through the decoy sheet to prevent the decoy sheet from catching sail in windy conditions as well as to aerate the pile structure.

1 Claim, 4 Drawing Sheets

(56) References Cited

U.S. PATENT DOCUMENTS

2021/0000101 A1* 1/2021 Pichik ................. A01M 31/025

OTHER PUBLICATIONS

Iannotti, Marie, Compost—Black Gold for Your Garden Soil, https://www.thespruce.com/compost-black-gold-for-your-garden-soil-1403130, published Jan. 6, 2020.*
On Deck Sports, 18 oz. Solid Vinyl Windscreen, https://www.ondecksports.com/18-oz-Solid-Vinyl, published Jun. 30, 2017.*

* cited by examiner

GAME BAIT DECOY

BACKGROUND OF THE INVENTION

The present invention relates to game hunting accessories and, more particularly, to a game bait decoy.

Hunting regulations in certain states and localities in the U.S. prevent hunters from baiting game animals (deer, turkey, and the like) with food such as corn, deer feed, minerals or other type of edibles used as attractants. Moreover, even when baiting is legal, use of attractants can be problematic: baiting can get wet on the ground due to rain and become moldy and ineffective. Also, edible game bait attracts unwanted animals, like raccoons, who eat the bait, remove the bait, spoil the bait (e.g., urinate in it), or otherwise render the bait useless for its intended purpose. And game bait is expensive.

Current game bait devices do not simulate attractant visually for attracting game animals without the use of perishable, edible food that can be expensive, be a hassle, become a mess or attract unwanted animals.

As can be seen, there is a need for game bait decoy. The game bait decoy may include many embodiments. In one embodiment, the game bait decoy may include a first surface providing game-attractant indicia, wherein the first surface is adapted to being anchoring to a second surface. For instant, the first surface may be a sheet that can be secured to the ground (second surface) by way of anchors.

In another embodiment, a three-dimensional game attractant decoy is provided. The game attractant decoy may be dimensioned and adapted to look like the game attractant it is simulating—for example, game attractant decoy may take the form, color and shape of corn kernels.

The present invention overcomes the problem of illegal baiting in certain areas and gives hunters the ability to use a non-edible bait decoy to visually attract game by simulating a bait pile, without the inconvenience of real game bait. Furthermore, where baiting game animals is legal, the game bait decoy embodied in the present invention can also be used as a bait cover for protecting the attractant from elements like rain, moisture, or from other non-game animals from disturbing or spoiling the bait pile as well as serving as an extra attractant.

SUMMARY OF THE INVENTION

In one aspect of the present invention, a game attractant includes a non-edible material that visually attracts game by mimicking edible game bait.

In another aspect of the present invention, the game attractant includes a decoy sheet having attractant simulating indicia.

In yet another aspect of the present invention method of visually attracting a game animal with inedible material includes the following: providing the above-mentioned decoy sheet; forming a pile structure on a ground surface; and covering the pile structure with the decoy sheet so that the attractant simulating indicia is outward facing.

These and other features, aspects and advantages of the present invention will become better understood with reference to the following drawings, description and claims.

DETAILED DESCRIPTION OF THE INVENTION

Figure 1:
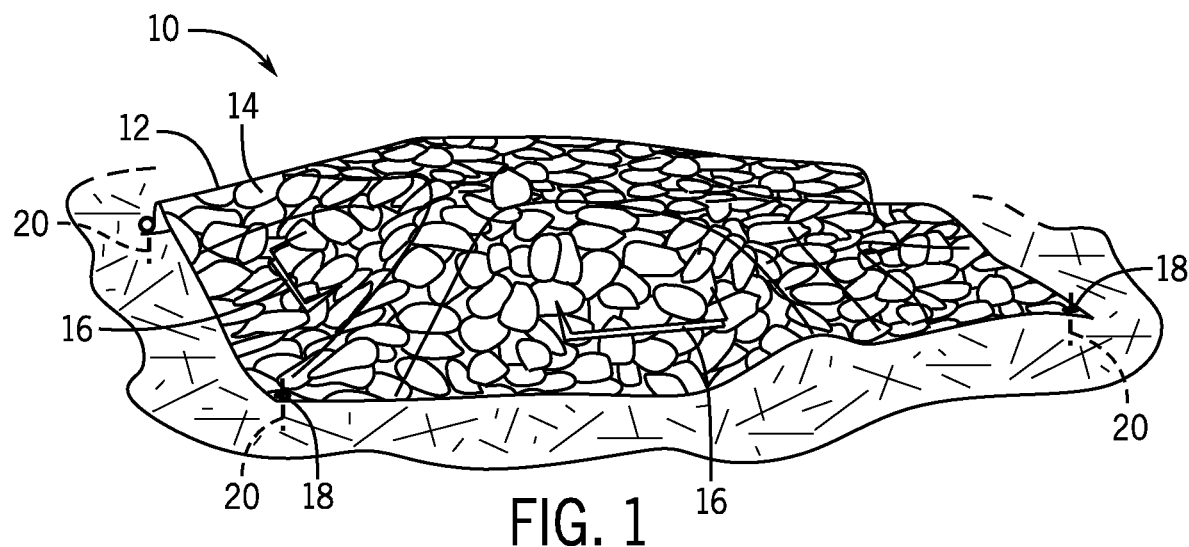
FIG. 1 is a perspective view of an exemplary embodiment of the present invention.
Figure 2:
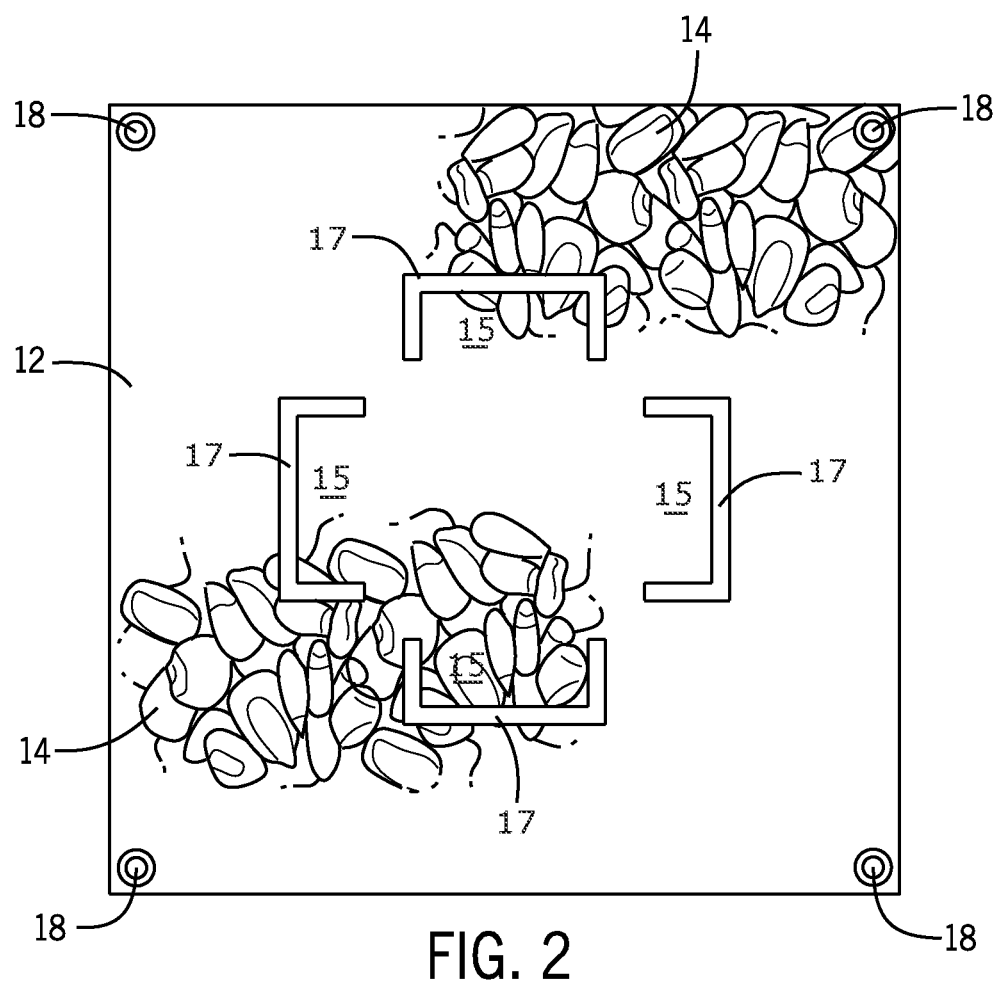
FIG. 2 is a top plan view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a non-edible game attractant that visually attracts game in the form of a game bait decoy. The game bait decoy may provide a decoy sheet of material having an attractant simulating indicia. The decoy sheet may be anchored to the ground over a pile structure to mimic the shape of a bait pile. The decoy sheet may provide flaps defined by slots for enabling animal access to the pile structure and allowing sufficient air flow through the decoy sheet to prevent the decoy sheet from catching sail in windy conditions as well as to aerate the pile structure.

Referring to FIGS. 1, 2, 7 and 8, the present invention may include a first game bait decoy 10, 60, 70, a second game bait decoy 30, a third game bait decoy 40 and/or a fourth game bait decoy 50. The first game bait decoy 10, 60, 70 may include a sheet 12 of, at least in part, strong, flexible, water-resistant or waterproof material, such as vinyl, rubber, of various plasticized materials, which resists stretching well in all directions and has a high abrasion resistance and tear strength, as well as resists mildew.

Figure 8:
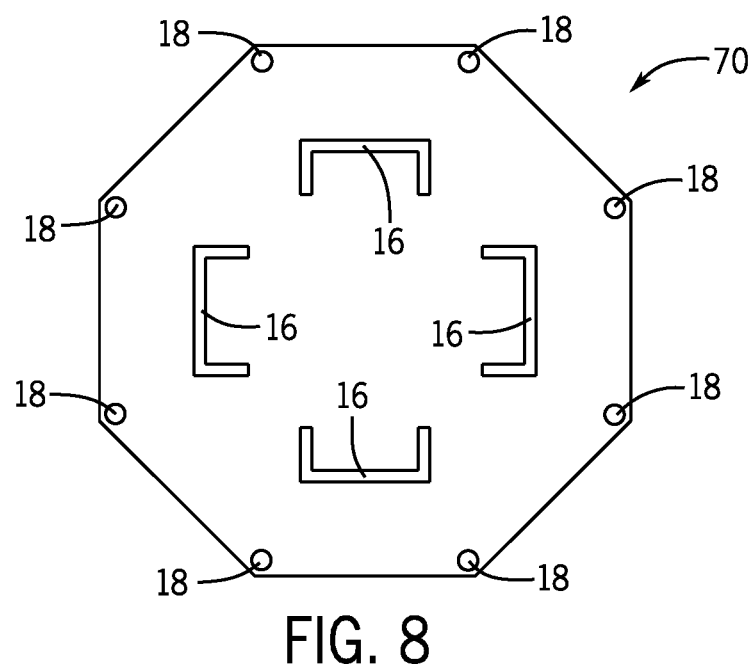
FIG. 8 is a top plan view of an exemplary embodiment of the present invention.

The sheet 12, in certain embodiments, may be a four-feet by four-feet square with a thickness of one to three centimeters. It should be understood that the sheet 12 may be any shape or size so long as the sheet 12 functions as disclosed herein. For instance, the sheet 12 may have an octagonal shape, as illustrated in FIG. 8.

The sheet 12 may have an upward-facing surface providing attractant simulating indicia 14, 62. The attractant simulating indicia 14, 62 may be decals, prints or the other images of edibles that game animals are attracted to, such as piles of corn, acorns, persimmons and apples, as well as turkey bait (food) like worms, bugs, and caterpillars nests, or the like.

The sheet may provide have a plurality of spaced apart flaps by way of air slots 16. In certain embodiments, each air slot 16 may be U-shaped with each cut measuring five inches by seven inches by five inches. In some embodiments, the edges of each flap 15 may have a wide protective strip 17 sewn to each five-inch and seven-inch section to extend past the cut section and overlap the cut sections, essentially extending the flaps 15. In these embodiments, there may be three overlap one-inch-wide strips 17 sewn into each of the four sections and if the flap section is five inches, then the overlap one-inch-wide section will be five inches long. Thus, if the flap section cut is seven inches long, the one-inch-wide protective strip 17 will be seven inches long, and will be sewn to the seven-inch section, so that once sewn, the one-inch-wide section will overlap the cut area for that section. Thus, the one-inch extensions 17 sewn onto the edges covering the slots 16 may act as cover flaps 15.

In localities where baiting is legal, the air slots 16 enable air to flow therethrough to prevent mold or mildew forming on any edible, perishable attractant that the sheet 12 covers. The air slots 16 may also allow air to flow through the sheet 12 for preventing the sheet from 'catching sail' in windy conditions. Furthermore, the slot extensions mentioned above may still allow air to flow while preventing animals from accessing the legal, edible attractant.

The sheet 12 may have reinforced grommets 18 just inward of a periphery thereof, possibly at each corner, to form attachment points for anchors 20, allowing the sheet 12 to be tied down or suspended.

Figure 3:
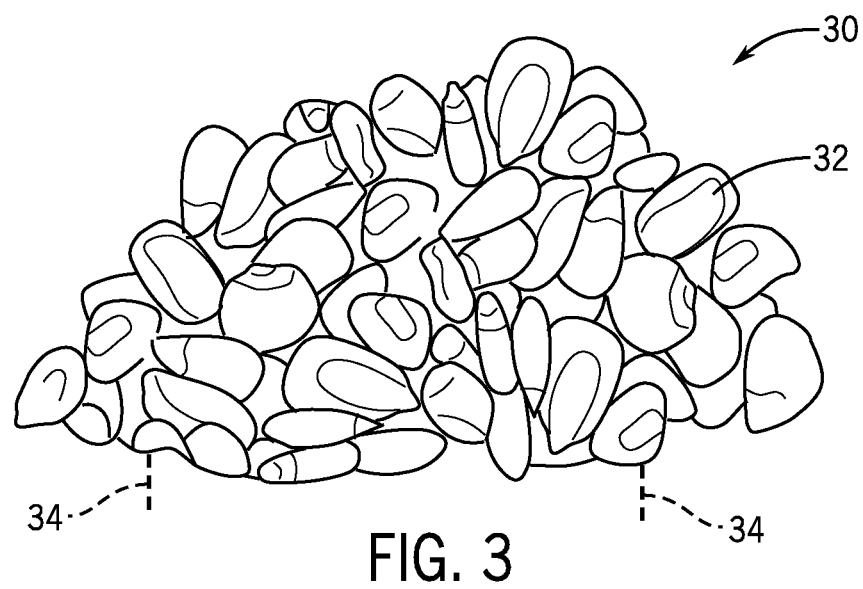
FIG. 3 is a perspective view of an exemplary embodiment of the present invention.

Referring to FIG. 3, the second game bait decoy 30 may be dimensioned and adapted to have the shape of a pile of bait. The second game bait decoy 30 may be formed from a mold, using a three-dimensional (3D) printer or via extrusion or an equivalent process to form a structure that resembles food or a plurality of food portions 32. The material of the second game bait decoy 30 may be various plasticized materials or other material conducive to 3D printing, extrusion, and the like. The second game bait decoy 30 may provide anchors 34, allowing the plurality of food portions 32 to be secured to the ground.

Figure 4:
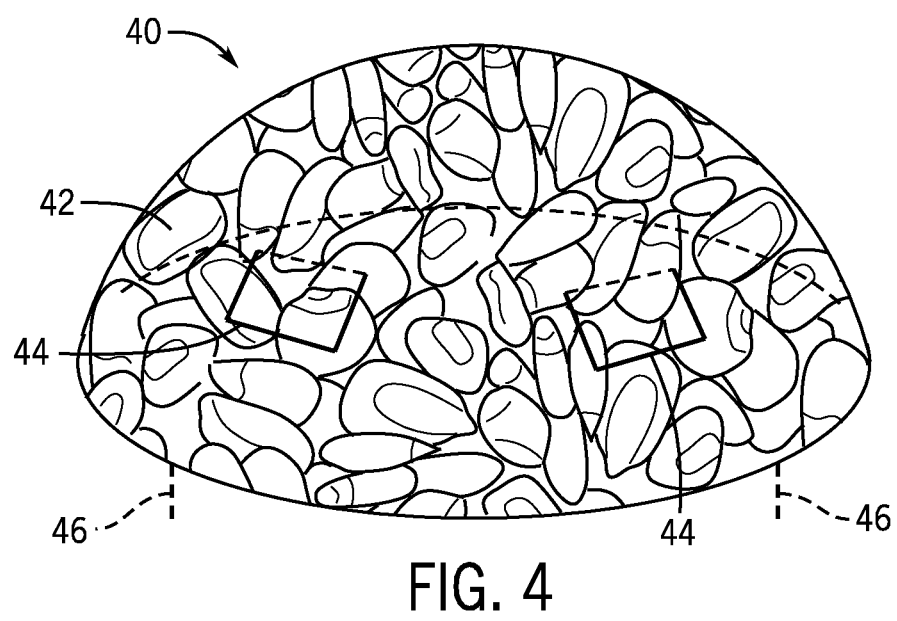
FIG. 4 is a perspective view of an exemplary embodiment of the present invention.

Referring to FIG. 4, the third game bait decoy 40 may have a generally semi-spherical shape so that the outward-facing surface providing the attractant simulating indicia 42 inherently simulates a bait pile or mound in shape, as illustrated in FIG. 4. The outward-facing surface may be a portion of a shell. The third game bait decoy 40 may provide hinged flaps 44 for allowing access and air flow into the volume circumscribed by the shell. The third game bait decoy 40 may have anchors 46 for securing the shell to the ground.

Figure 5:
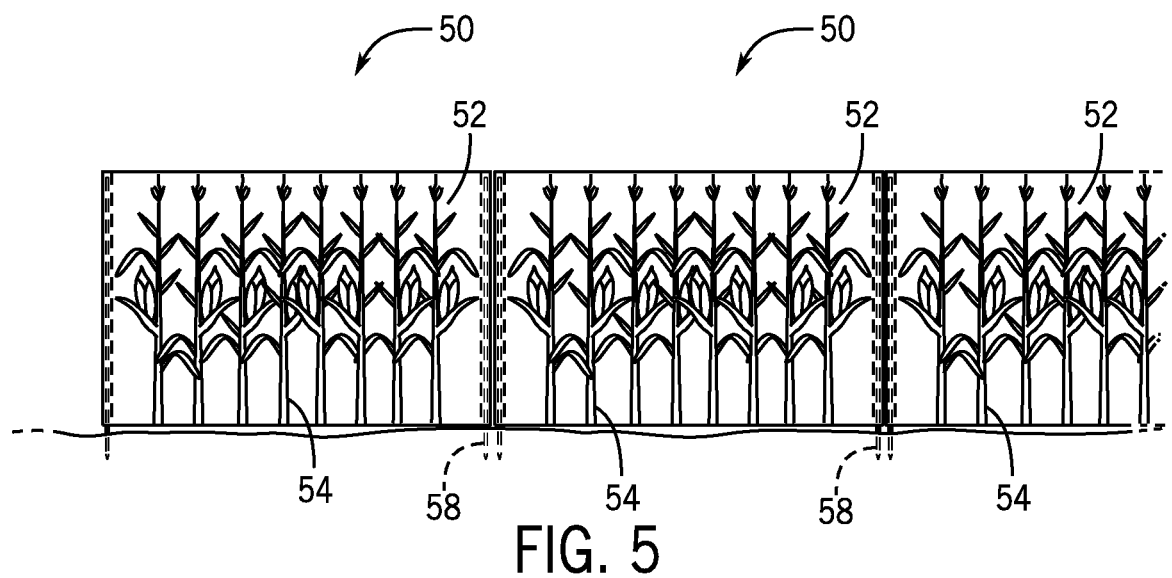
FIG. 5 is a side elevation view of an exemplary embodiment of the present invention.
Figure 6:
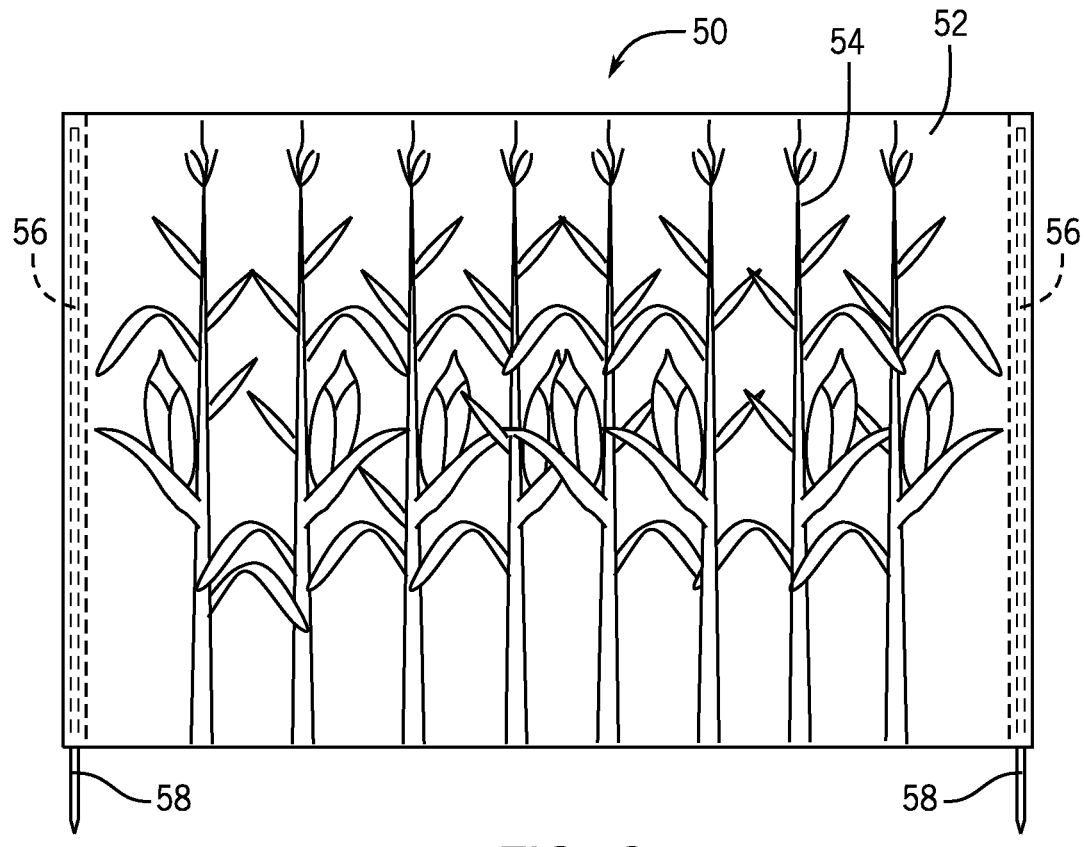
FIG. 6 is an enlarged detailed view of FIG. 5.
Figure 7:
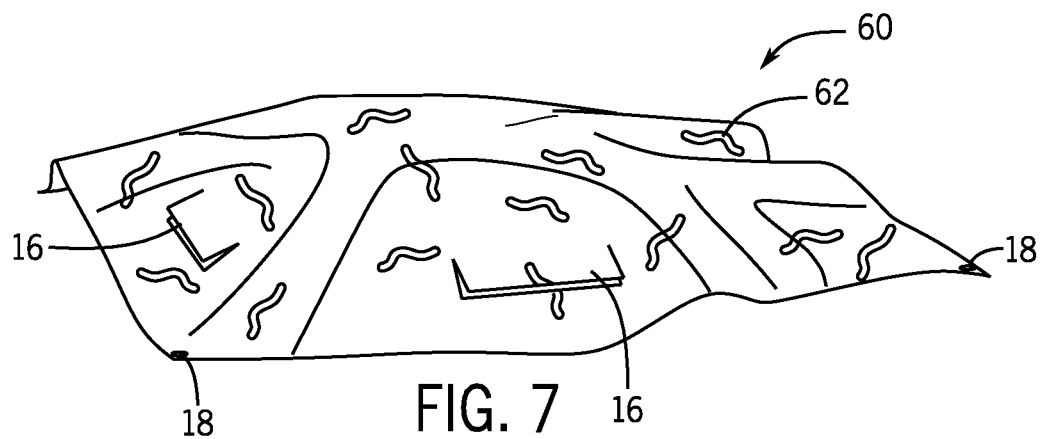
FIG. 7 is a perspective view of an exemplary embodiment of the present invention.

Referring to FIGS. 5 and 6, the fourth game bait decoy 50 may be a series of vertically oriented sheet 52 having attractant simulating indicia 54 disposed along an outward-facing surface thereof. Each sheet 52 may terminate in sleeves 56 for housing poles 58 that both are anchored in the ground for keeping the sheets 52 upright.

A method of using the present invention may include the following. The first game bait decoy 10, 60, 70, the second game bait decoy 30, the third game bait decoy 40 and the fourth game bait decoy 50 disclosed above may be provided. If a hunter wants to attract deer, and baiting is illegal, he can use the first game bait decoy 10, 60, 70, the second game bait decoy 30, the third game bait decoy 40 and/or the fourth game bait decoy 50 as a visual attractant to attract deer or turkey without illegally using edible, perishable bait. The present invention may include a non-edible scent spray exuding fumes of corn or persimmons, etc.

In localities where edible game bait is legal, the first game bait decoy 10, 60, 70 and the third game bait decoy 40 can also be placed on edible game bait as a cover to protect bait and food from moisture and elements. The present invention thus can also be used as a bait food dispersal system as the flaps cut into it to allow attracted game animals to lift the flap with their nose or hoof to expose and eat the bait.

The hunter may put the desired game bait decoy on the ground, stretched out with the attractant simulating indicia facing outward. Then the hunter may push dirt or leaves under this to create a pile structure. Then put stakes 20 through grommets 18 and into the ground, imitating a bait pile when covering the underlying pile structure. Then the hunter can use the non-edible scent spray as a smell attractant that mimics smell of food, if legal. This helps hunters get deer or turkeys in shooting range and assists hunters in getting an ethical shot at game animals.

Where baiting is legal, hunters can still use the game bait decoy to cover bait and/or use as a bait food dispersal system. This solves the problem of bait molding by covering the bait pile with water resistant cover. The present invention also helps reduces non-desired animals from ruining or spoiling the edible bait. The present invention also allows deer to feed through the flaps, and helps hunters keep and attract deer with food decoy even if food is underneath. The present invention helps hunters save money on deer food or at least get the money's worth on the deer food bait they do buy.

It should be understood, of course, that the foregoing relates to exemplary embodiments of the invention and that modifications may be made without departing from the spirit and scope of the invention as set forth in the following claims.

What is claimed is:

1. A game attractant feeding system consisting of:
   a decoy sheet that visually attracts game animals by mimicking edible game bait, the decoy sheet having:
      a lower surface;
      an upper surface with a center and a plurality of perimeter edges;
      game attractant simulating indicia across the entire upper surface, the game attractant simulating indicia representing said game bait to the game animals;
      a plurality of U-shaped slots spaced equidistantly apart along the decoy sheet and equidistantly from the center, the length of each slot extending parallel to one of the perimeter edges;
      a plurality of hinged flaps spaced apart along the decoy sheet, each flap defined by one of the slots;
      one or more edge extensions along a periphery of each flap, each edge extension being one inch wide and covering the associated slot to overlap a portion of said decoy sheet adjacent the associated slot; and
      a plurality of holes, each reinforced with a grommet, located inward of the plurality of perimeter edges;
   a plurality of stakes dimensioned to operatively associate with the plurality of holes; and
   a pile structure on a ground surface, the decoy sheet covering said pile structure such that the lower surface of the decoy sheet contacts the pile structure, the game attractant simulating indicia on the upper surface of the decoy sheet faces outward, and contours of the pile are visible along the upper surface of the decoy sheet;
   wherein the slots enable game animals to access the pile structure and enable air to flow through the decoy sheet to prevent mold or mildew from forming on the pile structure.

* * * * *